(12) United States Patent
Yamauchi et al.

(10) Patent No.: US 9,617,432 B2
(45) Date of Patent: Apr. 11, 2017

(54) PRIMER COMPOSITION

(71) Applicant: The Yokohama Rubber Co., LTD., Minato-ku, Tokyo (JP)

(72) Inventors: Shigeru Yamauchi, Hiratsuka (JP); Takanori Kido, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/911,362

(22) PCT Filed: Aug. 11, 2014

(86) PCT No.: PCT/JP2014/071206
§ 371 (c)(1),
(2) Date: Feb. 10, 2016

(87) PCT Pub. No.: WO2015/022942
PCT Pub. Date: Feb. 19, 2015

(65) Prior Publication Data
US 2016/0185975 A1 Jun. 30, 2016

(30) Foreign Application Priority Data

Aug. 12, 2013 (JP) ................. 2013-167834

(51) Int. Cl.
| C09D 5/00 | (2006.01) |
| C09D 7/12 | (2006.01) |
| C09D 183/08 | (2006.01) |
| C08F 230/08 | (2006.01) |
| C08G 77/20 | (2006.01) |
| C08G 77/28 | (2006.01) |

(52) U.S. Cl.
CPC ............. *C09D 5/002* (2013.01); *C09D 5/00* (2013.01); *C09D 7/12* (2013.01); *C09D 7/1233* (2013.01); *C09D 183/08* (2013.01); *C08F 230/08* (2013.01); *C08G 77/20* (2013.01); *C08G 77/28* (2013.01)

(58) Field of Classification Search
CPC . C07F 7/18; C07F 7/182; C08L 43/04; C08K 5/548
See application file for complete search history.

(56) References Cited

U.S. PATENT DOCUMENTS

| 5,192,364 A | 3/1993 | Inoue et al. |
| 5,318,618 A | 6/1994 | Inoue et al. |
| 5,445,871 A * | 8/1995 | Murase ............... C08J 7/045 428/213 |
| 6,121,943 A | 9/2000 | Nishioka et al. |
| 2004/0139887 A1 | 7/2004 | Zhang |

FOREIGN PATENT DOCUMENTS

| JP | H04-057870 | 2/1992 |
| JP | H05-076821 | 3/1993 |
| JP | H09-012923 | 1/1997 |
| JP | 2001-271030 | 10/2001 |
| JP | 2010-116490 | 5/2010 |
| JP | 2011-026546 | 2/2011 |
| WO | WO 2004/065649 | 8/2004 |

OTHER PUBLICATIONS

International Search Report for International Application No. PCT/JP2014/071206 dated Nov. 18, 2014, 4 pages, Japan.

* cited by examiner

*Primary Examiner* — Kuo-Liang Peng
(74) *Attorney, Agent, or Firm* — Thorpe North & Western

(57) ABSTRACT

A primer composition of the present technology contains an alkoxysilane compound (A), a mercaptosilane compound (B), a (meth)acrylsilane compound (C), a metal catalyst (D), an acid (E), and a solvent (F).

8 Claims, No Drawings

PRIMER COMPOSITION

TECHNICAL FIELD

The present technology relates to a primer composition.

BACKGROUND ART

Application of non-adhesive coatings, including acrylic melamine resin and the like, on bodies of automobiles has been increasingly employed recently. Regarding adhesion to such non-adhesive/non-adhesive coated boards, sufficient adhesion cannot be ensured even when a primer composition is used, and in particular, problems of poor initial adhesion and poor water resistant adhesion exist.

To increase adhesion, conventionally, carbon black has been blended to primer compositions. However, when carbon black is blended, problem exists in that discoloration due to the primer composition is conspicuous. Therefore, primer compositions that contain no carbon black and that can ensure adhesion to non-adhesive/non-adhesive coated boards have been demanded.

In response to such a demand, in Japanese Unexamined Patent Application Publication No. 2011-026546A, the inventors of the present technology have proposed "a primer composition containing: a polyester resin (A) having a number average molecular weight of 3000 or greater but less than 15000, and a polyisocyanate compound (B) having two or more isocyanate groups, where the polyester resin (A) has two or more aromatic carboxy groups".

By further investigating the primer composition described in Japanese Unexamined Patent Application Publication No. 2011-026546A, the inventors of the present technology have found out that external appearance may be inferior because the primer composition may be discolored due to effect of ultraviolet ray or the like, depending on the type of polyisocyanate compound.

SUMMARY

The present technology provides a primer composition which has excellent adhesion to non-adhesive/non-adhesive coated boards and has favorable external appearance.

The inventors of the present technology found that a primer composition containing a plurality of types of particular silane compounds and containing a metal catalyst, an acid, and a solvent can achieve excellent adhesion to non-adhesive/non-adhesive coated boards and favorable external appearance, and thus completed the present technology.

Specifically, the inventors discovered that the problems described above can be solved by the following features.

(1) A primer composition comprising: an alkoxysilane compound (A), a mercaptosilane compound (B), a (meth) acrylsilane compound (C), a metal catalyst (D), an acid (E), and a solvent (F).

(2) The primer composition according to (1) above, where a solid content is from 6 to 15% by mass.

(3) The primer composition according to (1) or (2) above, where a total content of the alkoxysilane compound (A), the mercaptosilane compound (B), and the (meth)acrylsilane compound (C) is from 1 to 20 parts by mass per 100 parts by mass of the solvent (F).

(4) The primer composition according to any one of (1) to (3) above, where a content of the acid (E) is from 1 to 5 parts by mass per 100 parts by mass of the solvent (F).

(5) The primer composition according to any one of (1) to (4) above, where the acid (E) is an organic acid having a carboxy group (—COOH) and/or a sulfo group (—SO$_3$H) and having an alkyl group having from 5 to 20 carbons.

(6) The primer composition according to (5) above, where the acid (E) further has an aromatic ring.

According to the present technology, a primer composition which has excellent adhesion to non-adhesive/non-adhesive coated boards and has favorable external appearance can be provided.

DETAILED DESCRIPTION

The present technology is explained in further detail below.

The primer composition of the present technology is a primer composition containing an alkoxysilane compound (A), a mercaptosilane compound (B), a (meth)acrylsilane compound (C), a metal catalyst (D), an acid (E), and a solvent (F).

The present technology achieves excellent adhesion to non-adhesive/non-adhesive coated boards and favorable external appearance by containing the alkoxysilane compound (A), the mercaptosilane compound (B), and the (meth)acrylsilane compound (C), as well as the metal catalyst (D), the acid (E), and the solvent (F).

Although the reason is not clear in detail, it is assumed to be as follows.

That is, it is conceived that this is because the surface of the coated board is improved due to the acid (E) by coating the primer composition on a non-adhesive/non-adhesive coated board, and reactivity (interaction) of the primer composition to both the improved coated surface and the adhesive agent (especially, urethane-based) is enhanced by allowing proper condensation and/or polymerization of the silane compounds (A) to (C), which have a particular functional group, to occur due to the metal catalyst (D).

The alkoxysilane compound (A), the mercaptosilane compound (B), the (meth)acrylsilane compound (C), the metal catalyst (D), the acid (E), and the solvent (F) as well as other components that can be contained as necessary will be described in detail below.

Alkoxysilane Compound (A)

The alkoxysilane compound (A) contained in the primer composition of the present technology is a compound that has at least a silicon atom and an alkoxy group and has no mercapto group and no (meth)acryloyloxy group.

Note that "(meth)acryloyloxy group" refers to an acryloyloxy group (CH$_2$=CHCOO—) or a methacryloyloxy group (CH$_2$=C(CH$_3$)COO—).

Examples of the alkoxysilane compound (A) include compounds represented by formula (1) below and the like.

[Formula 1]

$$R^2{}_{4-a}-Si-(OR^1)_a \quad (1)$$

In the formula, $R^1$ represents an alkyl group having from 1 to 4 carbons, $R^2$ represents a hydrocarbon group having from 1 to 20 carbons, and a represents an integer of 1 to 4. When a is from 2 to 4, the plurality of $R^1$ moieties may be the same or different, and when a is 1 or 2, the plurality of $R^2$ moieties may be the same or different.

Specific examples of the alkyl group having from 1 to 4 carbons include a methyl group, ethyl group, n-propyl group, isopropyl group, butyl group, and the like. Among these, a methyl group and ethyl group are preferable.

Examples of the monovalent aliphatic hydrocarbon group having from 1 to 20 carbons include alkyl groups having from 1 to 20 carbons (e.g. a methyl group, ethyl group, propyl group, butyl group, pentyl group, hexyl group, heptyl group, octyl group, ethylhexyl group, nonyl group, decyl group, dodecyl group, undecyl group, hexadecyl group, octadecyl group, cyclopropylmethyl group, trifluoroethyl group, and the like), alkenyl groups having from 2 to 20 carbons (e.g. a vinyl group, allyl group, and the like), aryl groups having from 6 to 20 carbons (e.g. a phenyl group, tolyl group, naphthyl group, and the like), aralkyl group having from 7 to 20 carbons (e.g. benzyl group, phenylethyl group, phenylpropyl group, and the like), and the like.

Specific examples of the alkoxysilane compound (A) include methyltrimethoxysilane, methyltriethoxysilane, dimethyldimethoxysilane, dimethyldiethoxysilane, n-propyltrimethoxysilane, n-propyltriethoxysilane, tetramethoxysilane, tetraethoxysilane, hexyltrimethoxysilane, hexyltriethoxysilane, octyltriethoxysilane, decyltrimethoxysilane, vinyltrimethoxysilane, vinyltriethoxysilane, phenyltrimethoxysilane, phenyltriethoxysilane, partial condensates of these, and the like. One type of these may be used alone or two or more types of these may be used in combination.

The content of the alkoxysilane compound (A) is preferably from 1 to 20 parts by mass, and more preferably from 2 to 8 parts by mass, per 100 parts by mass of the solvent (F) that is described below.

Mercaptosilane Compound (B)

The mercaptosilane compound (B) contained in the primer composition of the present technology is a compound that has a mercapto group and an alkoxysilyl group and has no (meth)acryloyloxy group.

Preferable examples of the alkoxysilyl group include functional groups represented by formula (2) below.

[Formula 2]

(2)

In the formula, $R^3$ represents an alkyl group having from 1 to 4 carbons, $R^4$ represents a hydrocarbon group having from 1 to 20 carbons, and b represents an integer of 1 to 3. When b is 2 or 3, the plurality of $R^3$ moieties may be the same or different, and when b is 1, the plurality of $R^4$ moieties may be the same or different.

Examples of the alkyl group having from 1 to 4 carbons of $R^3$ include the same groups described for $R^1$ in formula (1) above, and examples of the hydrocarbon group having from 1 to 20 carbons of $R^4$ include the same groups described for $R^2$ in formula (1) above.

Specific examples of the mercaptosilane compound (B) include 3-mercaptopropyltrimethoxysilane, 3-mercaptopropyltriethoxysilane, 3-mercaptopropylmethyldimethoxysilane, partial condensates of these, and the like. One type of these may be used alone or two or more types of these may be used in combination.

The content of the mercaptosilane compound (B) is preferably from 1 to 20 parts by mass, and more preferably from 2 to 8 parts by mass, per 100 parts by mass of the solvent (F) that is described below.

(Meth)Acrylsilane Compound (C)

The (meth)acrylsilane compound (C) contained in the primer composition of the present technology is a silane compound having an acryloyloxy group ($CH_2$=CHCOO—) or a methacryloyloxy group ($CH_2$=C($CH_3$)COO—), and an alkoxysilyl group.

Preferable examples of the alkoxysilyl group include the same functional groups described for the mercaptosilane compound (B).

Specific examples of the (meth)acrylsilane compound (C) include 3-(meth)acryloxypropyl(trimethoxysilane), 3-(meth)acryloxypropyl(triethoxysilane), 3-(meth)acryloxypropyl(diethoxymethoxysilane), 3-(meth)acryloxypropyl(tripropoxysilane), 3-(meth)acryloxypropyl(dipropoxymethoxysilane), 3-(meth)acryloxypropyl(tributoxysilane), 3-(meth)acryloxypropyl(dibutoxymethoxysilane), 3-(meth)acryloxypropyl(dimethoxymethylsilane), 3-(meth)acryloxypropyl(methoxydimethylsilane), 3-(meth)acryloxypropyl(diethoxymethylsilane), 3-(meth)acryloxypropyl(ethoxydimethylsilane), 3-(meth)acryloxypropyl(dipropoxymethylsilane), 3-(meth)acryloxypropyl(propoxydimethylsilane), 3-(meth)acryloxypropyl(diisopropoxymethylsilane), 3-(meth)acryloxypropyl(isopropoxydimethylsilane), 3-(meth)acryloxypropyl(dibutoxymethylsilane), 3-(meth)acryloxypropyl(butoxydimethylsilane), β-(meth)acryloxyethyl(trimethoxysilane), partial condensates of these, and the like. One type of these may be used alone or two or more types of these may be used in combination.

The content of the (meth)acrylsilane compound (C) is preferably from 0.05 to 5 parts by mass, and more preferably from 0.1 to 0.5 parts by mass, per 100 parts by mass of the solvent (F) that is described below.

In the present technology, the total content of the alkoxysilane compound (A), the mercaptosilane compound (B), and the (meth)acrylsilane compound (C) is preferably from 1 to 20 parts by mass, and more preferably from 5 to 10 parts by mass, per 100 parts by mass of the solvent (F) that is described below, from the perspective of long-term stability and coatability of the primer composition of the present technology.

Metal Catalyst (D)

The metal catalyst (D) contained in the primer composition of the present technology is not particularly limited.

Specific examples of the metal catalyst (D) include tin carboxylates such as dimethyltin dilaurate, dibutyltin dilaurate, dibutyltin maleate, dibutyltin diacetate, dioctyltin dilaurate, and tin naphthenate; titanate esters such as tetra-i-propoxy titanium, tetrabutyl titanate, and tetrapropyl titanate; organic aluminum compounds such as aluminum trisacetylacetonate, aluminum trisethyl acetoacetate, and diisopropoxyaluminum ethyl acetoacetate; chelate compounds such as zirconium tetraacetylacetonate and titanium tetraacetylacetonate; metal octanoates such as lead octanoate and bismuth octanoate; and the like. One type of these may be used alone or two or more types of these may be used in combination.

Among these, the metal catalyst (D) is preferably titanate esters from the perspective of achieving favorable weatherability.

The content of the metal catalyst (D) is preferably from 0.01 to 1.0 part by mass, and more preferably from 0.05 to 0.8 parts by mass, per 100 parts by mass of the solvent (F) that is described below.

Acid (E)

The acid (E) contained in the primer composition of the present technology may be an inorganic acid (e.g. hydrochloric acid, sulfuric acid, phosphoric acid, perchloric acid, and the like) or may be an organic acid (e.g. carboxylic acid, sulfonic acid, phenol, and the like), and the acid (E) is preferably an organic acid.

In the present technology, the acid (E) is preferably an organic acid having a carboxy group (—COOH) and/or a sulfo group (—SO$_3$H) and having an alkyl group having from 5 to 20 carbons, from the perspective of achieving even more favorable adhesion to non-adhesive/non-adhesive coated boards.

Furthermore, from the perspective of achieving even more favorable adhesion, the organic acid is more preferably a compound having an aromatic ring.

Specific examples of the carboxylic acid, which is an example of the organic acid of the acid (E), include saturated monocarboxylic acids such as formic acid, acetic acid, propionic acid, butyric acid, and cyclohexanecarboxylic acid; saturated dicarboxylic acids such as oxalic acid, malonic acid, succinic acid, glutaric acid, and adipic acid; unsaturated carboxylic acids such as acrylic acid, methacrylic acid, propiolic acid, crotonic acid, maleic acid, fumaric acid, oleic acid, linoleic acid, and linolenic acid; aromatic carboxylic acids such as benzoic acid, phthalic acid, isophthalic acid, terephthalic acid, 1-naphthoic acid, and toluic acid; heterocyclic carboxylic acids such as nicotinic acid, isonicotinic acid, furancarboxylic acid, and thiophencarboxylic acid; and the like.

Furthermore, specific examples of the sulfonic acid, which is another example of the organic acid, include alkylsulfonic acids such as ethanesulfonic acid, dodecylsulfonic acid, and camphorsulfonic acid; aromatic sulfonic acids such as benzenesulfonic acid, p-toluenesulfonic acid, p-dodecylbenzenesulfonic acid, alkylnaphthalenesulfonic acid, and anthraquinonesulfonic acid; macroheterocyclic compounds of sulfonic acid such as copper phthalocyanine tetrasulfonate and porphyrin tetrasulfonate; polysulfonic acid such as polystyrenesulfonic acid, polyvinylsulfonic acid, and naphthalenesulfonic acid condensates; salts of these; and the like.

Among these, from the perspective of achieving even more favorable compatibility to sealant, which is an agent to bond non-adhesive/non-adhesive coated boards to glass or the like that is a target adherend, p-dodecylbenzenesulfonic acid is preferable.

In the present technology, the content of the acid (E) is preferably from 1 to 5 parts by mass per 100 parts by mass of the solvent (F) that is described below.

Solvent (F)

The solvent (F) contained in the primer composition of the present technology is not particularly limited, and organic solvents that are used in conventionally known primer compositions or the like can be suitably used.

The solvent (F) is preferably a polar solvent, and specific examples thereof include halogen-based solvents such as trichloroethylene; ester-based solvents such as ethyl acetate and butyl acetate; ketone-based solvents such as acetone, methyl ethyl ketone, and methyl isobutyl ketone; alcohol-based solvents such as methanol, ethanol, isopropanol (IPA), 2-methoxymethanol, 2-butoxyethanol, and propylene glycol monomethyl ether; silicone-based solvents such as hexamethylcyclotrisiloxane, octamethylcyclotetrasiloxane, and decamethylcyclopentasiloxane; and the like. One type of these may be used alone or two or more types of these may be used in combination.

In the present technology, although the content of the solvent (F) is not particularly limited; however, the content of the solvent (F) is preferably from 70 to 99% by mass, and more preferably from 75 to 95% by mass relative to the total mass of the primer composition.

Additives (Optional Components)

As necessary, the primer composition of the present technology may contain various additives such as fillers, UV absorbents, dispersants, dehydrating agents, adhesion promoter, and the like, in a range that does not inhibit the effects of the present technology.

The solid content of the primer composition of the present technology that contains the essential components (A) to (F) and optional components described above is preferably from 6 to 15% by mass from the perspective of achieving favorable coatability.

Production Method

Although the production method of the primer composition of the present technology is not particularly limited, for example, a method can be used in which the essential components and the optional components described above are thoroughly mixed in a closed vessel using a mixer such as a combination mixer or the like.

Adherends to which the primer composition of the present technology is applied are not particularly limited; however, examples thereof include glass, metals, wooden materials, plastics, coated surfaces of these, and the like.

Examples of non-adhesive/non-adhesive coated boards include acrylic/acrylic coated boards, epoxy/epoxy coated boards, silicone/silicone coated boards, and the like.

Furthermore, preferable examples of the adhesive agent or sealant that is used together with the primer composition of the present technology include urethane-based, urethane epoxy-based, and other adhesive agents or sealants.

The present technology will now be described in greater detail using the following examples, but is in no way limited to these examples.

EXAMPLES

The present technology will now be described in greater detail using the following examples, but is in no way limited to these examples.

Working Examples 1 to 6 and Comparative Examples 1 to 4

Primer compositions were obtained by mixing the components in Table 1 below according to the compositions shown in the same table (shown as part by mass) using a mixer.

Comparative Example 5

As described in Table 2 below, an aromatic isocyanate-based primer composition (RC-50EC, manufactured by the Yokohama Rubber Co., Ltd.) was used.

Comparative Example 6

As described in Table 2 below, an aromatic isocyanate-based primer composition containing carbon black (RC-50E, manufactured by the Yokohama Rubber Co., Ltd.) was used.

Comparative Example 7

As described in Table 2 below, an aliphatic isocyanate-based primer composition (primer No. 55, manufactured by the Yokohama Rubber Co., Ltd.) was used.

Adhesive Strength (Initial)

The obtained primer composition was coated on a non-adhesive/non-adhesive, acrylic-melamine coated board and left for 2 minutes at 20° C. Thereafter, a urethane-based window sealant (WS-222, manufactured by the Yokohama Rubber Co., Ltd.) was coated in a manner that the thickness was 3 mm, and cured for 168 hours in a condition at 20° C. and 65% RH to produce a test sample.

The window sealant of the obtained test sample was cut using a knife. Then, the cut portion was gripped by hand and pulled. Adhesive strength was evaluated according to the following criteria by observing the peeling condition of the cut portion.

The evaluation of the adhesive strength (initial) was performed in a manner that the test sample having a proportion of the area with cohesive failure (CF) of the window sealant relative to the area of adhesion of 100% was evaluated as "⊚", the test sample having a thin partial cohesive failure was evaluated as "O", the test sample having a partial adhesive failure (AF) was evaluated as "Δ", and the test sample having the proportion of the adhesive failure of 100% was evaluated as "X". The results are shown in Tables 1 and 2 below.

Note that, in the evaluation of the initial adhesive strength, the evaluation result of "⊚" or "O" indicates favorable adhesion and indicates no problems in practical use.

Adhesive Strength (Water Resistance)

The obtained primer composition was coated on a non-adhesive/non-adhesive, acrylic-melamine coated board, left for 2 minutes at 20° C., and further left in water at 50° C. for 1 day or for 14 days. Thereafter, a urethane-based window sealant (WS-222, manufactured by the Yokohama Rubber Co., Ltd.) was coated in a manner that the thickness was 3 mm, and cured for 168 hours in a condition at 20° C. and 65% RH to produce a test sample.

The window sealant of the obtained test sample was cut using a knife. Then, the cut portion was gripped by hand and pulled. Adhesive strength was evaluated according to the following criteria by observing the peeling condition of the cut portion.

The evaluation of the adhesive strength (water resistance) was performed in a manner that the test sample having a proportion of the area with cohesive failure (CF) of the window sealant relative to the area of adhesion of 100% was evaluated as "⊚", the test sample having a thin partial cohesive failure was evaluated as "O", the test sample having a partial adhesive failure (AF) was evaluated as "Δ", and the test sample having the proportion of the adhesive failure of 100% was evaluated as "X". The results are shown in Tables 1 and 2 below.

Note that, in the evaluation of the water resistant adhesive strength, the evaluation result of "⊚", "O", or "Δ" indicates favorable adhesion and indicates no problems in practical use.

External Appearance

The obtained primer composition was coated on a non-adhesive/non-adhesive, acrylic-melamine coated board and left for 2 minutes at 20° C., transparency of the coated primer layer was checked visually. The results are shown in Tables 1 and 2 below.

Weatherability

The sample that had been evaluated for the external appearance was irradiated for 24 hours using a sunshine weather meter (WEL-SUN-D, manufactured by Suga Test Instruments Co., Ltd.).

Thereafter, in the same manner as for the evaluation of the external appearance, transparency of the primer and the window sealant was checked visually. The case where the primer and the window sealant remained transparent was evaluated as "O", and the case where the primer and the window sealant were discolored was evaluated as "X". Note that discoloration of the primer used in Comparative Example 6 containing carbon black was not confirmed since the test sample prior to the irradiation was black. The results are shown in Tables 1 and 2 below.

TABLE 1

(Silane-based primer)

| | | Working Examples | | | | |
|---|---|---|---|---|---|---|
| | | 1 | 2 | 3 | 4 | 5 |
| Solvent F1 | Ethyl acetate | 13.7 | 7.3 | 13.7 | 13.7 | 13.7 |
| Solvent F2 | IPA | 19.42 | 19.42 | 19.42 | 19.42 | 19.42 |
| Alkoxysilane compound A1 | KBM-04 | 0.03 | 0.03 | 0.03 | 0.03 | 0.03 |
| Alkoxysilane compound A2 | KBE-04 | 1.42 | 1.42 | 1.42 | 1.42 | 1.42 |
| Mercaptosilane compound B1 | KBM-803 | 1.2 | 1.2 | 1.2 | 1.2 | 1.2 |
| Methacrylsilane compound C1 | KBM-503 | 0.07 | 0.07 | 0.07 | 0.07 | 0.07 |
| Metal catalyst D1 (titanium catalyst) | A-1 | 0.18 | 0.18 | 0.18 | 0.18 | 0.18 |
| Metal catalyst D2 (tin catalyst) | U-810 | — | — | — | — | — |
| Organic acid E1 | DBSA | 0.2 | 0.2 | 0.5 | — | — |
| Organic acid E2 | EHA | — | — | — | 0.5 | — |
| Inorganic acid E3 | Hydrochloric acid | 0.3 | 0.3 | — | — | 0.5 |
| Adhesive strength (initial) | | ⊚ | ⊚ | ⊚ | ⊚ | ⊚ |
| Adhesive strength (water resistance, 50° C. for 1 day) | | ⊚ | ⊚ | ⊚ | ⊚ | ⊚ |
| Adhesive strength (water resistance, 50° C. for 14 days) | | ⊚ | ⊚ | ⊚ | O | Δ |
| External appearance | | Transparent | Transparent | Transparent | Transparent | Transparent |
| Weatherability | | O | O | O | O | O |

TABLE 1-continued (Silane-based primer)

|  |  | Working Example | Comparative Examples | | | |
|---|---|---|---|---|---|---|
|  |  | 6 | 1 | 2 | 3 | 4 |
| Solvent F1 | Ethyl acetate | 13.7 | 13.7 | 13.7 | 13.7 | 13.7 |
| Solvent F2 | IPA | 19.42 | 19.42 | 19.42 | 19.42 | 19.42 |
| Alkoxysilane compound A1 | KBM-04 | 0.03 | 0.03 | 0.03 | 0.03 | — |
| Alkoxysilane compound A2 | KBE-04 | 1.42 | 1.42 | 1.42 | 1.42 | — |
| Mercaptosilane compound B1 | KBM-803 | 1.2 | — | 1.2 | 1.2 | 2.62 |
| Methacrylsilane compound C1 | KBM-503 | 0.07 | 0.07 | — | 0.07 | 0.07 |
| Metal catalyst D1 (titanium catalyst) | A-1 | — | 0.18 | 0.18 | 0.18 | 0.18 |
| Metal catalyst D2 (tin catalyst) | U-810 | 0.18 | — | — | — | — |
| Organic acid E1 | DBSA | 0.5 | 0.5 | 0.5 | — | 0.5 |
| Organic acid E2 | EHA | — | — | — | — | — |
| Inorganic acid E3 | Hydrochloric acid | — | — | — | — | — |
| Adhesive strength (initial) |  | ◉ | ◉ | ◉ | ○ | ○ |
| Adhesive strength (water resistance, 50° C. for 1 day) |  | ◉ | X | Δ | Δ | Δ |
| Adhesive strength (water resistance, 50° C. for 14 days) |  | ○ | X | X | X | X |
| External appearance |  | Transparent | Transparent | Transparent | Transparent | Transparent |
| Weatherability |  | ○ | ○ | ○ | ○ | ○ |

TABLE 2

|  | Comparative Examples | | |
|---|---|---|---|
|  | 5 | 6 | 7 |
| Isocyanate-based primer | Aromatic polyisocyanate | Aromatic polyisocyanate + carbon black | Aliphatic polyisocyanate |
| Adhesive strength (initial) | ◉ | ◉ | X |
| Adhesive strength (water resistance 50° C. for 1 day) | ◉ | ◉ | X |
| Adhesive strength (water resistance 50° C. for 14 days) | ◉ | ◉ | X |
| External appearance | Transparent | Opaque (black) | Transparent |
| Weatherability | X | (not confirmed) | ○ |

The components listed in Table 1 are described below.

Solvent F1: Ethyl acetate

Solvent F2: Isopropyl alcohol (IPA)

Alkoxysilane compound A1: Tetramethoxysilane (KBM-04, manufactured by Shin-Etsu Chemical Co., Ltd.)

Alkoxysilane compound A2: Tetraethoxysilane (KBE-04, manufactured by Shin-Etsu Chemical Co., Ltd.)

Mercaptosilane compound B1: 3-Mercaptopropyltrimethoxysilane (KBM-803, manufactured by Shin-Etsu Chemical Co., Ltd.)

Methacrylsilane compound C1: 3-Methacryloxypropyltriethoxysilane (KBM-503, manufactured by Shin-Etsu Chemical Co., Ltd.)

Metal catalyst D1 (titanium catalyst): Tetra-i-propoxy titanium (A-1, manufactured by Nippon Soda Co., Ltd.)

Metal catalyst D2 (tin catalyst): Dioctyltin dilaurate (Neostann U-810, manufactured by Nitto Kasei Co., Ltd.)

Organic acid E1: Dodecylbenzenesulfonic acid (DBSA)

Organic acid E2: 2-Ethylhexanoic acid (EHA)

Organic acid E3: Hydrochloric acid

As is clear from the results shown in Tables 1 and 2, when a conventionally known isocyanate-based primer composition was used, either one of adhesion or external appearance was poor (Comparative Examples 5 to 7).

It was also found that Comparative Examples 1 to 4, in which one of alkoxysilane compound (A), mercaptosilane compound (B), (meth)acrylsilane compound (C), or acid (E) was absent, resulted in poor adhesion although external appearance thereof was favorable.

On the other hand, it was confirmed that Working Examples 1 to 6, in which the alkoxysilane compound (A), the mercaptosilane compound (B), and the (meth)acrylsilane compound (C), as well as the metal catalyst (D), the acid (E), and the solvent (F) were contained, achieved excellent adhesion to non-adhesive/non-adhesive coated boards and favorable external appearance.

In particular, Working Examples 1 to 3, in which a titanium catalyst was used as the metal catalyst (D) and dodecylbenzenesulfonic acid was used as the acid (E), achieved favorable adhesion even after being left in water at 50° C. for 14 days.

The invention claimed is:

1. A primer composition comprising: an alkoxysilane compound (A), a mercaptosilane compound (B), a (meth)acrylsilane compound (C), a metal catalyst (D), an acid (E), and a solvent (F).

2. The primer composition according to claim 1, wherein a solid content is from 6 to 15% by mass.

3. The primer composition according to claim 1, wherein a total content of the alkoxysilane compound (A), the mercaptosilane compound (B), and the (meth)acrylsilane compound (C) is from 1 to 20 parts by mass per 100 parts by mass of the solvent (F).

4. The primer composition according to claim 3, wherein a content of the acid (E) is from 1 to 5 parts by mass per 100 parts by mass of the solvent (F).

5. The primer composition according to claim 3, wherein the acid (E) is an organic acid having at least one selected from the group consisting of a carboxy group (—COOH) and a sulfo group (—SO3H) and having an alkyl group having from 5 to 20 carbons.

6. The primer composition according to claim 1, wherein a content of the acid (E) is from 1 to 5 parts by mass per 100 parts by mass of the solvent (F).

7. The primer composition according to claim 1, wherein the acid (E) is an organic acid having at least one selected from the group consisting of a carboxy group (—COOH) and a sulfo group (—SO$_3$H) and having an alkyl group having from 5 to 20 carbons.

8. The primer composition according to claim 7, wherein the acid (E) further has an aromatic ring.

* * * * *